US010161318B2

(12) United States Patent
Stroup

(10) Patent No.: US 10,161,318 B2
(45) Date of Patent: *Dec. 25, 2018

(54) SYSTEM, METHOD, AND APPARATUS FOR INJECTING A GAS IN A DIESEL ENGINE

(71) Applicant: James A. Stroup, Lakeland, FL (US)

(72) Inventor: James A. Stroup, Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,688

(22) Filed: Jul. 31, 2017

(65) Prior Publication Data

US 2018/0283291 A1    Oct. 4, 2018

Related U.S. Application Data

(63) Continuation of application No. 15/477,851, filed on Apr. 3, 2017, now Pat. No. 9,752,515.

(51) Int. Cl.
*F02D 19/08* (2006.01)
*F02D 19/06* (2006.01)
(Continued)

(52) U.S. Cl.
CPC ......... *F02D 19/081* (2013.01); *F02D 19/061* (2013.01); *F02D 19/0642* (2013.01);
(Continued)

(58) Field of Classification Search
CPC ...... F02D 19/081; F02D 19/061; F02D 19/08; F02D 19/0642; F02D 19/0647;
(Continued)

(56) References Cited

U.S. PATENT DOCUMENTS

| 3,077,189 A | 2/1963 | Earnshaw et al. |
| RE26,145 E | 1/1967 | Friddell |

(Continued)

FOREIGN PATENT DOCUMENTS

WO    2008104764    9/2008

OTHER PUBLICATIONS

Written Opinion dated Apr. 19, 2012 for Application No. PCT/US2011/055646.

(Continued)

*Primary Examiner* — Mahmoud Gimie
(74) *Attorney, Agent, or Firm* — Larson & Larson, P.A.; Frank Liebenow; Justin P. Miller

(57) ABSTRACT

A secondary fuel injection system determines (precisely) a maximum amount of secondary fuel that can be injected into a cylinder during a cycle based upon the rotational speed (RPM) of the engine. A primary fuel injection pulse width of the prior cycle and is used to determine how much heat energy was requested by an engine control module based upon the duration of the injection pulse. Secondary fuel is injected into the intake port of the cylinder after the exhaust valve closes in an amount that is calculated based upon the maximum that can be injected during the allowed calculated time of crankshaft rotation and the amount of heat energy requested in the prior cycle and to include the amount of primary fuel that is then injected into the cylinder is being reduced based upon the amount of heat energy provided by the secondary fuel that was previously injected.

19 Claims, 12 Drawing Sheets

(51) Int. Cl.
  *F02D 41/00* (2006.01)
  *F02D 41/26* (2006.01)
  *F02D 35/02* (2006.01)

(52) U.S. Cl.
  CPC ......... *F02D 19/0647* (2013.01); *F02D 19/08* (2013.01); *F02D 35/025* (2013.01); *F02D 35/028* (2013.01); *F02D 41/0025* (2013.01); *F02D 41/0027* (2013.01); *F02D 41/26* (2013.01)

(58) Field of Classification Search
  CPC .. F02D 35/025; F02D 35/028; F02D 41/0025; F02D 41/0027; F02D 41/26
  USPC .......................................................... 123/525
  See application file for complete search history.

(56) References Cited

U.S. PATENT DOCUMENTS

| | | |
|---|---|---|
| 3,753,424 A | 8/1973 | Haidvogel |
| 4,089,310 A | 5/1978 | Noguchi |
| 4,096,833 A | 6/1978 | Sweet |
| 4,155,332 A | 5/1979 | Yaegashi |
| 4,278,064 A | 7/1981 | Regueiro |
| 4,463,734 A | 8/1984 | Akeroyd |
| 4,535,728 A | 8/1985 | Batchelor |
| 4,614,168 A | 9/1986 | Batchelor |
| 5,044,344 A | 9/1991 | Tuckey |
| 5,143,553 A | 9/1992 | Mukaihira |
| 5,150,685 A | 9/1992 | Porter et al. |
| 5,315,981 A | 5/1994 | Chen |
| 5,355,854 A | 10/1994 | Aubee |
| 5,379,740 A * | 1/1995 | Moore ................ F02D 19/0605 123/27 GE |
| 5,996,557 A | 12/1999 | Muraki |
| 6,003,478 A | 12/1999 | Huber |
| 6,202,601 B1 | 3/2001 | Ouellette et al. |
| 6,250,260 B1 | 6/2001 | Green |
| 6,543,395 B2 | 4/2003 | Green |
| 6,543,423 B2 | 4/2003 | Dobryden |
| 6,560,528 B1 | 5/2003 | Gitlin |
| 6,591,817 B2 | 7/2003 | Deutsch |
| 6,668,804 B2 | 12/2003 | Dobryden |
| 6,684,852 B2 | 2/2004 | Wright et al. |
| 6,814,032 B2 | 11/2004 | Goto |
| 6,863,034 B2 | 3/2005 | Kern |
| 6,910,269 B2 | 6/2005 | Burkhart |
| 6,999,869 B1 | 2/2006 | Gitlin |
| 7,019,626 B1 | 3/2006 | Funk |
| 7,045,916 B2 | 5/2006 | Stolt et al. |
| 7,093,588 B2 | 8/2006 | Edwards |
| 7,222,015 B2 | 5/2007 | Davis |
| 7,228,841 B2 | 6/2007 | Takemoto et al. |
| 7,270,089 B2 | 9/2007 | Wong |
| 7,284,506 B1 | 10/2007 | Sun |
| 7,373,931 B2 | 5/2008 | Lennox |
| 7,444,986 B2 | 11/2008 | Shute |
| 7,509,209 B2 | 3/2009 | Davis |
| 7,591,253 B2 | 9/2009 | Martindale |
| 7,591,257 B2 | 9/2009 | Bayer et al. |
| 7,627,416 B2 | 12/2009 | Batenburg et al. |
| 7,703,435 B2 | 4/2010 | Surnilla et al. |
| 7,770,562 B2 | 8/2010 | Pursifull et al. |
| 7,913,673 B2 | 3/2011 | Vanderslice |
| 8,011,094 B2 | 9/2011 | Burkhart |
| 8,108,120 B2 | 1/2012 | Griese |
| 8,118,006 B2 | 2/2012 | Pursifull |
| 8,220,439 B2 | 7/2012 | Fisher |
| 8,364,384 B2 | 1/2013 | Pursifull |
| 8,412,439 B2 | 4/2013 | Warner et al. |
| 8,463,528 B2 | 6/2013 | Cologna |
| 8,539,938 B2 | 9/2013 | Elwart et al. |
| 8,688,351 B2 | 4/2014 | Oalen |
| 2002/0007805 A1 | 2/2002 | Green |
| 2002/0020388 A1 | 2/2002 | Wright et al. |
| 2003/0089346 A1 | 5/2003 | Burkhart |
| 2003/0097997 A1 | 5/2003 | Lynch et al. |
| 2003/0131827 A1 | 7/2003 | Dobryden |
| 2005/0281057 A1 | 12/2005 | Jung |
| 2007/0125321 A1 | 6/2007 | Ritter |
| 2007/0157912 A1 | 7/2007 | Ritter et al. |
| 2007/0256648 A1 | 11/2007 | Sun et al. |
| 2008/0048631 A1 | 2/2008 | Kim |
| 2009/0071452 A1 | 3/2009 | Phlips |
| 2009/0114188 A1 | 5/2009 | Peters |
| 2010/0147262 A1 | 6/2010 | Martin |
| 2010/0292911 A1 | 11/2010 | Cologna |
| 2011/0011369 A1 | 1/2011 | Jaasma et al. |
| 2012/0085326 A1 | 4/2012 | Mo et al. |
| 2016/0208749 A1* | 7/2016 | Sivasubramanian ....................... F02D 41/0025 |

OTHER PUBLICATIONS

International Search Report dated Apr. 19, 2012 for Application No. PCT/US2011/055646.

* cited by examiner

BARAM GASEOUS TECHNOLOGY CORP.

*Generic Forulula for Diesel Injection*

$$(Diesel\ Inj\ Pulse\ us\ *\ Diesel\ Inj\ BTU\ per\ us) -$$

$$IF\left(\left(\frac{60e6}{RPM*360} * LNG\ Inj\ Window * LNG\ Inj\ per\ us * \#LNG\ Injectors\right) \leq \left(\frac{Diesel\ Inj\ Pulse\ us\ *\ Diesel\ Inj\ BTU\ per\ us\ *\ Target\ Replacement\ Ratio}{LNG\ Inject\ BTU\ per\ Us\ *\ \#\ LNG\ Injectors}\right)\right)$$

$$THEN$$

$$IF\left((Diesel\ Inj\ Pulse\ us\ @idle\ *\ Diesel\ Inj\ BTU\ per\ Us) \leq \left(\frac{Diesel\ Inj\ Pulse\ us\ *\ Diesel\ Inj\ BTU\ per\ us\ *\ Target\ Replacement\ Ratio}{LNG\ Inject\ BTU\ per\ Us\ *\ \#\ LNG\ Injectors}\right)\right)$$

$$THEN$$
$$(0)$$
$$ELSE$$

$$(Diesel\ Inj\ Pulse\ us\ *\ Diesel\ Inj\ BTU\ per\ us\ *\ Target\ Replacement\ Ratio)$$

$$ELSE$$

$$\left(\frac{60e6}{RPM*360} * Gas\ Inj\ Window * LNG\ Inject\ BTU\ per\ US * \#LNG\ Injectors\right)$$

$$\div$$

$$Diesel\ Inj\ BTU\ per\ us$$

EXPLAINATION:

*FIG. 7*

*Diesel Injector Size Estimation*
*Parameters taken from Assumptions / Parameters Tab*

| | Unit | Figure |
|---|---|---|
| Torque | | 1,700 |
| RPM | FTLBS | 1,200 |
| Diesel Burn per Hour (LB) | LB | 139 |
| Number of Cylinders | Each | 6 |
| Thermal Eff @ RPM | Proportion | 40.0% |
| | | |
| Horsepower | HP | 388.42 |
| BTUs per HP | BTU | 2,546.10 |
| | | |
| BTUs Burned Per Hour | BTU | 2,472,412.41 |
| | | |
| BTUs burned per Cylinder per hour | BTU | 412,068.74 |
| | | |
| BTUs per min per Cylinder | BTU | 6,867.81 |
| | | |
| Combustion Strokes per Cylinder Per min | Strokes | 600.00 |
| | | |
| BTUs per combustion stroke | BTU | 11.45 |
| | | |
| Stroke Degrees for Fuel injection | Degrees | 15 |
| | | |
| Proportion of combustion stroke available for fuel injection | Proportion | 0.041666667 |
| Rotations per sec | Rotations | 20 |
| Degrees per sec | Degrees | 7200 |
| Seconds per degree of rotation | Seconds | 0.000139 |
| | | |
| Fuel injection window (sec) | Seconds | 0.002083 |
| | | |
| BTU injected per cylinder, per sec | BTU | 5,494.25 |
| | | |
| BTU injected per µs | BTU | 0.005494 |

*FIG. 8*

*Ideal replacement Schedule based on Input parameters.*
*Does not account for any real world scenario like injector pulse width limitations, minimal diesel fuel requirements*

| Input Diesel Injector Pulse Width (μs) | Diesel BTUs Requested by ECU | Ideal Natural Gas BTUs | Ideal Diesel BTU | Replacement Rate | Ideal Output Diesel Pulse width (μs) | Ideal Output Natural Gas Pulse Width (per μs) |
|---|---|---|---|---|---|---|
| 500 | 2.747 | 2.335 | 0.412 | 85.0% | 75.0 | 8,763.3 |
| 550 | 3.022 | 2.569 | 0.453 | 85.0% | 82.5 | 9,639.6 |
| 600 | 3.297 | 2.802 | 0.494 | 85.0% | 90.0 | 10,515.9 |
| 650 | 3.571 | 3.036 | 0.536 | 85.0% | 97.5 | 11,392.2 |
| 700 | 3.846 | 3.269 | 0.577 | 85.0% | 105.0 | 12,268.6 |
| 750 | 4.121 | 3.503 | 0.618 | 85.0% | 112.5 | 13,144.9 |
| 800 | 4.395 | 3.736 | 0.659 | 85.0% | 120.0 | 14,021.2 |
| 850 | 4.670 | 3.970 | 0.701 | 85.0% | 127.5 | 14,897.5 |
| 900 | 4.945 | 4.203 | 0.742 | 85.0% | 135.0 | 15,773.9 |
| 950 | 5.220 | 4.437 | 0.783 | 85.0% | 142.5 | 16,650.2 |
| 1000 | 5.494 | 4.670 | 0.824 | 85.0% | 150.0 | 17,526.5 |
| 1050 | 5.769 | 4.904 | 0.865 | 85.0% | 157.5 | 18,402.8 |
| 1100 | 6.044 | 5.137 | 0.907 | 85.0% | 165.0 | 19,279.2 |
| 1150 | 6.318 | 5.371 | 0.948 | 85.0% | 172.5 | 20,155.5 |
| 1200 | 6.593 | 5.604 | 0.989 | 85.0% | 180.0 | 21,031.8 |
| 1250 | 6.868 | 5.838 | 1.030 | 85.0% | 187.5 | 21,908.1 |
| 1300 | 7.143 | 6.071 | 1.071 | 85.0% | 195.0 | 22,784.5 |
| 1350 | 7.417 | 6.305 | 1.113 | 85.0% | 202.5 | 23,660.8 |
| 1400 | 7.692 | 6.538 | 1.154 | 85.0% | 210.0 | 24,537.1 |
| 1450 | 7.967 | 6.772 | 1.195 | 85.0% | 217.5 | 25,413.4 |
| 1500 | 8.241 | 7.005 | 1.236 | 85.0% | 225.0 | 26,289.8 |
| 1550 | 8.516 | 7.239 | 1.277 | 85.0% | 232.5 | 27,166.1 |
| 1600 | 8.791 | 7.472 | 1.319 | 85.0% | 240.0 | 28,042.4 |
| 1650 | 9.066 | 7.706 | 1.360 | 85.0% | 247.5 | 28,918.7 |
| 1700 | 9.340 | 7.939 | 1.401 | 85.0% | 255.0 | 29,795.1 |
| 1750 | 9.615 | 8.173 | 1.442 | 85.0% | 262.5 | 30,671.4 |
| 1800 | 9.890 | 8.406 | 1.483 | 85.0% | 270.0 | 31,547.7 |
| 1850 | 10.164 | 8.640 | 1.525 | 85.0% | 277.5 | 32,424.0 |
| 1900 | 10.439 | 8.873 | 1.566 | 85.0% | 285.0 | 33,300.4 |
| 1950 | 10.714 | 9.107 | 1.607 | 85.0% | 292.5 | 34,176.7 |
| 2000 | 10.988 | 9.340 | 1.648 | 85.0% | 300.0 | 35,053.0 |
| 2050 | 11.263 | 9.574 | 1.689 | 85.0% | 307.5 | 35,929.3 |
| 2100 | 11.538 | 9.807 | 1.731 | 85.0% | 315.0 | 36,805.7 |
| 2150 | 11.813 | 10.041 | 1.772 | 85.0% | 322.5 | 37,682.0 |
| 2200 | 12.087 | 10.274 | 1.813 | 85.0% | 330.0 | 38,558.3 |
| 2250 | 12.362 | 10.508 | 1.854 | 85.0% | 337.5 | 39,434.6 |
| 2300 | 12.637 | 10.741 | 1.896 | 85.0% | 345.0 | 40,311.0 |
| 2350 | 12.911 | 10.975 | 1.937 | 85.0% | 352.5 | 41,187.3 |
| 2400 | 13.186 | 11.208 | 1.978 | 85.0% | 360.0 | 42,063.6 |
| 2450 | 13.461 | 11.442 | 2.019 | 85.0% | 367.5 | 42,939.9 |
| 2500 | 13.736 | 11.675 | 2.060 | 85.0% | 375.0 | 43,816.3 |
| 2550 | 14.010 | 11.909 | 2.102 | 85.0% | 382.5 | 44,692.6 |
| 2600 | 14.285 | 12.142 | 2.143 | 85.0% | 390.0 | 45,568.9 |
| 2650 | 14.560 | 12.376 | 2.184 | 85.0% | 397.5 | 46,445.2 |
| 2700 | 14.834 | 12.609 | 2.225 | 85.0% | 405.0 | 47,321.6 |
| 2750 | 15.109 | 12.843 | 2.266 | 85.0% | 412.5 | 48,197.9 |
| 2800 | 15.384 | 13.076 | 2.308 | 85.0% | 420.0 | 49,074.2 |
| 2850 | 15.659 | 13.310 | 2.349 | 85.0% | 427.5 | 49,950.5 |
| 2900 | 15.933 | 13.543 | 2.390 | 85.0% | 435.0 | 50,826.9 |
| 2950 | 16.208 | 13.777 | 2.431 | 85.0% | 442.5 | 51,703.2 |
| 3000 | 16.483 | 14.010 | 2.472 | 85.0% | 450.0 | 52,579.5 |
| 3050 | 16.757 | 14.244 | 2.514 | 85.0% | 457.5 | 53,455.8 |
| 3100 | 17.032 | 14.477 | 2.555 | 85.0% | 465.0 | 54,332.2 |
| 3150 | 17.307 | 14.711 | 2.596 | 85.0% | 472.5 | 55,208.5 |
| 3200 | 17.582 | 14.944 | 2.637 | 85.0% | 480.0 | 56,084.8 |
| 3250 | 17.856 | 15.178 | 2.678 | 85.0% | 487.5 | 56,961.1 |
| 3300 | 18.131 | 15.411 | 2.720 | 85.0% | 495.0 | 57,837.5 |
| 3350 | 18.406 | 15.645 | 2.761 | 85.0% | 502.5 | 58,713.8 |
| 3400 | 18.680 | 15.878 | 2.802 | 85.0% | 510.0 | 59,590.1 |
| 3450 | 18.955 | 16.112 | 2.843 | 85.0% | 517.5 | 60,466.4 |

*FIG. 9A*

| | | | | | | |
|---|---|---|---|---|---|---|
| 3500 | 19.230 | 16.345 | 2.884 | 85.0% | 525.0 | 61,342.8 |
| 3550 | 19.505 | 16.579 | 2.926 | 85.0% | 532.5 | 62,219.1 |
| 3600 | 19.779 | 16.812 | 2.967 | 85.0% | 540.0 | 63,095.4 |
| 3650 | 20.054 | 17.046 | 3.008 | 85.0% | 547.5 | 63,971.7 |
| 3700 | 20.329 | 17.279 | 3.049 | 85.0% | 555.0 | 64,848.1 |
| 3750 | 20.603 | 17.513 | 3.091 | 85.0% | 562.5 | 65,724.4 |
| 3800 | 20.878 | 17.746 | 3.132 | 85.0% | 570.0 | 66,600.7 |
| 3850 | 21.153 | 17.980 | 3.173 | 85.0% | 577.5 | 67,477.0 |
| 3900 | 21.428 | 18.213 | 3.214 | 85.0% | 585.0 | 68,353.4 |
| 3950 | 21.702 | 18.447 | 3.255 | 85.0% | 592.5 | 69,229.7 |
| 4000 | 21.977 | 18.680 | 3.297 | 85.0% | 600.0 | 70,106.0 |
| 4050 | 22.252 | 18.914 | 3.338 | 85.0% | 607.5 | 70,982.3 |
| 4100 | 22.526 | 19.147 | 3.379 | 85.0% | 615.0 | 71,858.7 |
| 4150 | 22.801 | 19.381 | 3.420 | 85.0% | 622.5 | 72,735.0 |
| 4200 | 23.076 | 19.614 | 3.461 | 85.0% | 630.0 | 73,611.3 |
| 4250 | 23.351 | 19.848 | 3.503 | 85.0% | 637.5 | 74,487.6 |
| 4300 | 23.625 | 20.081 | 3.544 | 85.0% | 645.0 | 75,364.0 |
| 4350 | 23.900 | 20.315 | 3.585 | 85.0% | 652.5 | 76,240.3 |
| 4400 | 24.175 | 20.548 | 3.626 | 85.0% | 660.0 | 77,116.6 |
| 4450 | 24.449 | 20.782 | 3.667 | 85.0% | 667.5 | 77,992.9 |
| 4500 | 24.724 | 21.016 | 3.709 | 85.0% | 675.0 | 78,869.3 |
| 4550 | 24.999 | 21.249 | 3.750 | 85.0% | 682.5 | 79,745.6 |
| 4600 | 25.274 | 21.483 | 3.791 | 85.0% | 690.0 | 80,621.9 |
| 4650 | 25.548 | 21.716 | 3.832 | 85.0% | 697.5 | 81,498.2 |
| 4700 | 25.823 | 21.950 | 3.873 | 85.0% | 705.0 | 82,374.6 |
| 4750 | 26.098 | 22.183 | 3.915 | 85.0% | 712.5 | 83,250.9 |
| 4800 | 26.372 | 22.417 | 3.956 | 85.0% | 720.0 | 84,127.2 |
| 4850 | 26.647 | 22.650 | 3.997 | 85.0% | 727.5 | 85,003.5 |
| 4900 | 26.922 | 22.884 | 4.038 | 85.0% | 735.0 | 85,879.9 |
| 4950 | 27.197 | 23.117 | 4.079 | 85.0% | 742.5 | 86,756.2 |
| 5000 | 27.471 | 23.351 | 4.121 | 85.0% | 750.0 | 87,632.5 |

*FIG. 9B*

SYSTEM, METHOD, AND APPARATUS FOR INJECTING A GAS IN A DIESEL ENGINE

CROSS-REFERENCE TO RELATED APPLICATION

This application is a continuation of U.S. patent application Ser. No. 15/477,851, filed Apr. 3, 2017, the disclosure of which is hereby incorporated by reference.

FIELD

This invention relates to the field of internal combustion engines and more particularly to a system for precisely injecting a gaseous fuel (e.g. natural gas) sequentially into each cylinder intake valve port of a multiple cylinder engine.

BACKGROUND

Today, most heavy duty trucks and many other vehicles are powered by a diesel engine. The volatility of diesel fuel prices compared to the relative stability of contract natural gas prices, provides both budgetary confidence and reduction of diesel fuel costs when used as a secondary fuel introduced into a diesel engine.

There is an advantage of utilizing a gaseous secondary fuel (liquefied or compressed and stored in the vehicle) to offset the usage of diesel fuel, as many such gases have a lower cost per unit of energy than diesel fuel. Examples of such gaseous fuels are liquid propane gas, liquid natural gas, compressed natural gas and compressed hydrogen gas.

There have been many attempts to supplement a secondary gaseous fuel for diesel fuel in the applications mentioned above. For example, liquid propane gas has been used as an alternative fuel in spark ignited engines using kits that provide total substitution of gaseous propane for gasoline for many years being very successful. However, when introduction is made of a gaseous fuel into a diesel engine whereby the gaseous propane is introduced to a single point injector or multiple injection points into the engine intake manifold or intake air plenum of the diesel engine. The theory is that the increase added fuel (secondary fuel) will increase the engine speed/power beyond what the engine controller senses is required or requested and thus the stock engine controller will automatically reduce the volume of the primary diesel fuel. The stock engine controller acts, in this case, as a governor reducing the amount of primary diesel fuel provided to the diesel injectors of the diesel engine, thus managing power output of the engine. In theory, the reduction in diesel fuel injection produces a net cost saving. However, these types of fumigation or multi-port systems no matter the level of sophistication cannot control the volume of secondary fuel being ingested by each cylinder of a multi-cylinder engine. These type fumigation and multi-port fumigation system can control a basic volume ratio of secondary fuel to a primary, but cannot control the actual volume of secondary fuel actually entering a specific cylinder of a multi-cylinder diesel engine.

Another method of reducing diesel (primary fuel) injected into the engine cylinder is done by remapping the primary diesel fuel delivery map parameters of the stock engine controller. This is not desirable for several reasons including cost and variances in OEM fuel maps that regulate speed and power output of various engines in an OEM engine manufacturer's engine family, but most important the OEM fuel map is extremely difficult to duplicate exactly, thus use of primary fuel remapping causes an engine to be under fueled or over fueled. Both fueling conditions are undesirable and can harm the diesel engine.

What is required by the heavy duty diesel users is a blended fuel system that will add a secondary fuel (e.g. supplemental fuel) precisely to each cylinder seamlessly utilizing the stock engine controller and a secondary controller/processor which measures to within one millionth of a second the OEM fuel mapping (primary diesel fuel injection signal pulse) for each cylinder diesel injection event of a multi-cylinder engine to compute the BTU energy level of the diesel primary fuel being injected, which processes that primary diesel fuel signal to construct an injection ratio (e.g. a replacement ratio) of a secondary gaseous fuel based solely on the BTU energy level of the last injection event of the primary diesel fuel and the time available to inject the secondary gaseous fuel during a specific cylinder's next intake cycle and modifies (shortens) the pulse width of the next primary diesel fuel injection so that the exact BTU energy level designated by the original engine fuel map for a specific cylinder is met using a combination of secondary gaseous BTU energy content plus the BTU energy content of the next primary diesel fuel injection.

SUMMARY

In an engine, an engine control module requests injection of an amount of a primary fuel needed to provide an amount of heat energy needed to supply a requisite power output (horsepower). The request is made by a primary injection pulse having a primary injection pulse width. An amount of secondary fuel (e.g. compressed natural gas) containing a specific heat value (number of BTUs) computed as a percentage of the total heat value injected into cylinder during the last primary fuel injection event, is injected into the intake valve port. The amount of secondary fuel provides a supplemental amount of heat energy and, subsequently, the primary injection pulse is intercepted and reduced by the amount of supplemental heat energy before reaching the primary fuel injectors.

In one embodiment, a secondary fuel injection system is disclosed including a source of secondary fuel and secondary fuel injectors fluidly coupled to the source of secondary fuel. The secondary fuel injectors are electrically controlled to inject an amount of the secondary fuel into an intake valve port of a respective cylinder of an engine. A device of the engine is used for determining the rotational speed of a crankshaft of the engine (e.g. tachometer). A processor receives the rotational speed of the crankshaft and software running on the processor calculates an amount of time available for injection of the secondary fuel into the intake valve port of the respective cylinder. The processor receives primary fuel injection pulses from an engine control module of the engine then calculates an amount of heat energy that was injected into the combustion chamber of a specific cylinder during the latest primary diesel fuel injection event by measuring the primary diesel injector pulse width and multiplying the width of the primary fuel injection pulse by an amount of heat energy per time period based upon data gathered from the OEM published engine specifications and/or actual tests of the engine. The processor calculates an amount of heat that is to be provided to the engine by injection of the secondary fuel and electrically controls the secondary fuel injector to open after the respective exhaust valve of the engine's respective cylinder closes, thereby providing the amount of heat energy that is to be provided to the engine by the injection of the secondary fuel during the next intake cycle of the respective cylinder. The processor reduces the pulse width of the primary fuel injection pulse sent to the specific primary fuel (diesel fuel) injector from the engine control module of the engine by an amount equal to the heat energy that is to be provided to the engine by injection of the secondary fuel.

In another embodiment, a method of supplementing a primary fuel with a secondary fuel in an engine is disclosed including calculating a maximum amount of secondary fuel that can be injected into a cylinder of the engine based upon the secondary fuel, the number of secondary fuel injectors interfaced to the intake valve port of each cylinder of a multi-cylinder engine, the flow rate of each of the secondary fuel injectors, and a time window that is proportional to the rotational speed of a crankshaft of the engine. Calculating a maximum amount of heat energy that can be provided by the secondary fuel injectors is performed by multiplying a primary fuel injection pulse width from the last primary fuel injection event of the specific cylinder by an amount of heat per time period that would be delivered to the engine given the primary fuel injection pulse width. A replacement ratio is determined by comparing the maximum amount of energy provided by the latest primary fuel injection event to the maximum amount of secondary fuel that can be injected by the secondary fuel given the maximum energy volume of secondary fuel and the duration of secondary fuel injection time. If the replacement ratio is greater than a predetermined maximum replacement ratio (e.g., 85%), the replacement ratio is set to the predetermined maximum replacement ratio (e.g. 85%). The secondary fuel injection window is fixed to a time between the specific cylinder's exhaust valve(s) of the cylinder close, and before that cylinder piston reaches bottom dead center of the intake stroke. An amount of secondary fuel is injected into the intake valve port of the cylinder determined by the replacement ratio and engine speed (RPM) which determines the secondary fuel injection window duration. When the next primary fuel injection pulse is received, a portion of the primary fuel injection pulse width is utilized to reflect the primary and secondary fuels blend ratio and the remainder of the primary fuel injection pulse is diverted to a resistance load dump coil.

BRIEF DESCRIPTION OF THE DRAWINGS

The invention can be best understood by those having ordinary skill in the art by reference to the following detailed description when considered in conjunction with the accompanying drawings in which:

FIG. 7 illustrates a calculation for a diesel fuel engine with supplemental (secondary gaseous fuel) compressed natural gas injection.

FIG. 8 illustrates a calculation of parameters for a diesel fuel engine with supplemental (secondary gaseous fuel) compressed natural gas injection.

FIGS. 9A and 9B illustrate sample diesel replacement rates for a diesel fuel engine with supplemental (secondary gaseous fuel) compressed natural gas injection computed using the logic formula shown in FIG. 7.

DETAILED DESCRIPTION

Figure 1:
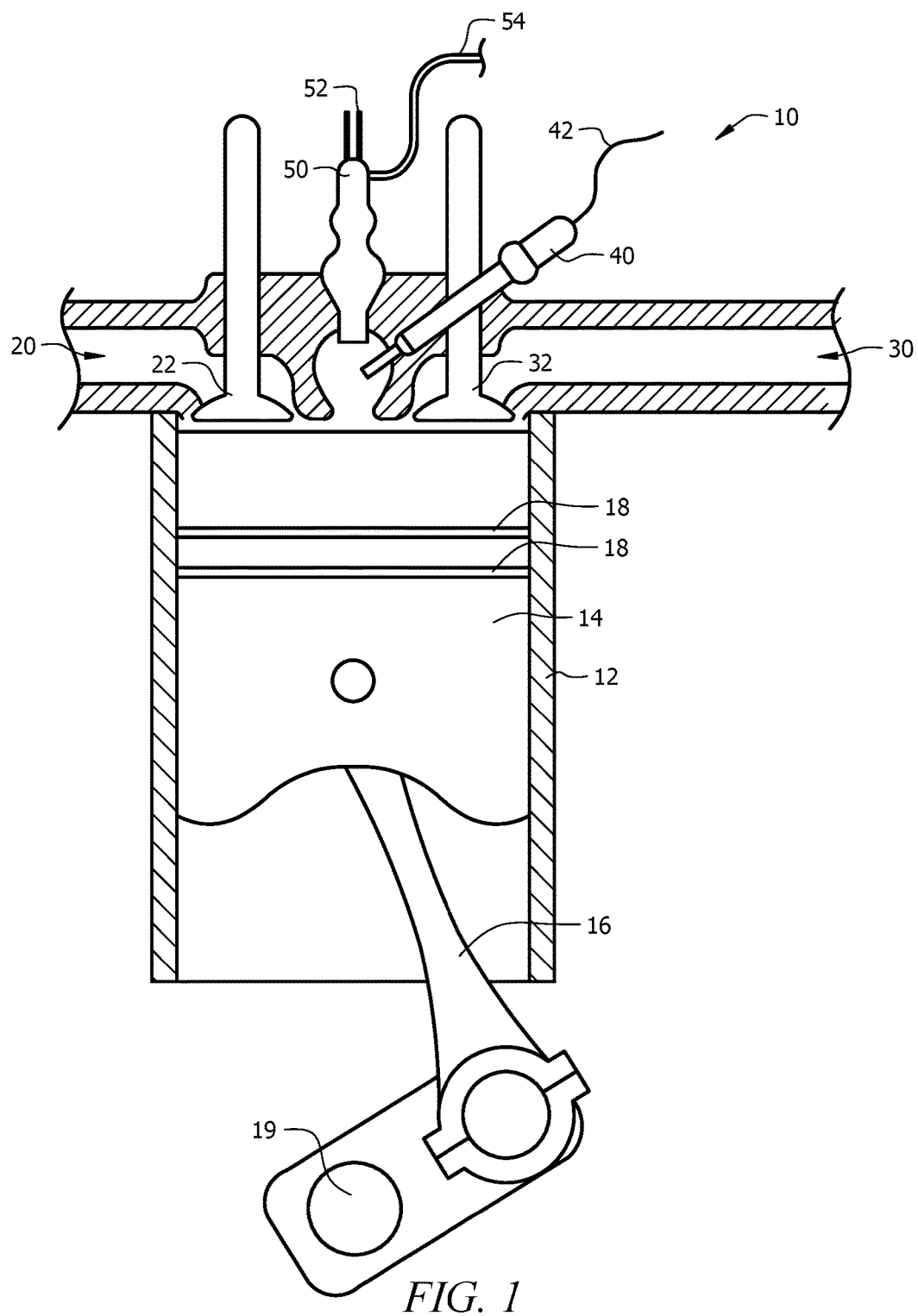
FIG. 1 illustrates a cut-away view of a single cylinder of a diesel engine of the prior art.

Reference will now be made in detail to the presently preferred embodiments of the invention, examples of which are illustrated in the accompanying drawings. Throughout the following detailed description, the same reference numerals refer to the same elements in all figures.

The diesel engine used herein is a heat engine, of which the output (e.g. horsepower of output) is proportional to the heat input measured by, for example, the latent British thermal units (BTUs) of the primary fuel being consumed. The cylinders shown are part of an engine that includes multiple cylinders, for example one, two, four, six, eight, twelve, sixteen, eighteen, twenty-four, etc., cylinders.

Throughout this description, a secondary fuel (e.g., a gas) is controllably injected into intake valve port of a compression ignition engine, preferably a diesel engine. Although any flammable gas is anticipated, including, but not limited to, liquid propane gas, liquid natural gas, compressed hydrogen gas and compressed natural gas; the examples shown will use compressed natural gas as an example for clarity and brevity reasons.

As will be discussed, in general, it is desired to use the primary fuel (e.g., diesel) during high horsepower and high speed and high torque and low speeds, but in all speed and power combinations throughout the horsepower and torque curves of the specific engine to supplement the primary fuel with a secondary fuel, reducing the injection of the primary fuel while increasing the injection of the secondary fuel in equivalent thermal energy unit amounts (e.g. equivalent BTUs). As often is the case, the secondary fuel does not provide an equal ratio of thermal energy units per unit measure as the primary fuel and, therefore, the supplemental injection amounts are based upon the BTU energy content of the primary fuel and the secondary fuel, therefore providing an equivalent total BTU to the engine.

Referring to FIG. 1, a cut-away view of a cylinder 10 of a diesel engine of the prior art is shown. This exemplary cylinder 10 has a cylinder wall 12, a piston 14 within the cylinder wall 12 having rings 18 that provide compression until the piston 14 expands due to heating. The piston 14 is connected to the crankshaft 19 by a connecting rod 16.

The piston 14 compresses the air/fuel charge of the combustion chamber at the top of the ignition cycle, heating the air/fuel charge to a temperature that causes auto ignition of the primary diesel fuel.

In some older engines, a glow plug 40 is provided power on wires 42. A tip of the glow plug 40 heats air within the cylinder 10 to provide initial start-up ignition assistance.

Primary fuel (e.g. diesel fuel) from primary fuel distribution system 52 is injected into the cylinder 10 during the compression/ignition cycle by a primary fuel injector 50 controlled by an electrical primary fuel injection pulse from a primary fuel injection wire 54. In some diesel fuel injection systems, the electrical pulse control is limited to metering the volume of diesel fuel to be injected through a camshaft, cam follower, push rod and rocker arm mechanical system. This type of electro-mechanical diesel fuel system is not shown for the sake of clarity and brevity.

Air required for combustion flows into the cylinder 10 through an intake valve port 20 during an intake cycle as the piston 14 moves downward (with respect to FIG. 1) and the intake valve 22 is open. The intake valve 22 is opened by a cam shaft, valve rods, rocker arm, and lifters that are not shown for brevity and clarity reasons.

As the piston 14 moves downward a partial vacuum takes place in the cylinder 10 causing air to rush into cylinder 10. This rapid induction of air from the intake manifold (plenum) at the intake valve port 20 stops abruptly as the piston 14 reaches bottom dead center (end of the intake cycle) and the intake valve 22 closes. As the piston 14 moves past bottom dead center of its travel and with the intake valve 22 closed, the compression/ignition cycle begins. At some point between mid-upward travel of the piston 14 and before reaching the top dead center of its travel, the primary fuel injector 50 which has been electronically or mechanically charged with a volume of primary diesel fuel, is activated by electric pulse (current) energizing an injection activation coil or if the primary diesel fuel is injected by mechanical means but has been metered to the injector electronically, the primary diesel fuel is injected by the primary fuel injector 50 either by electronic or mechanical means into the cylinder 10 combustion chamber.

During the compression/ignition cycle, the duration of electrical pulse sent to the primary fuel injector 50 by the engine control module 80 is intercepted and measured by components of the precision blending controller 100 to be used during the next intake cycle when secondary gaseous fuel injection 60a,b, . . . n occurs. Details of this process are in the following discussion relating to FIG. 2.

As the piston 14 approaches the limit of its upward travel, the primary diesel fuel ignites causing a chain reaction that ignites all the primary fuel charge, including any secondary fuel charge, driving the piston 14 downward as the combustion air expands from the latent heat/thermal energy (BTU's) of the primary and secondary fuels being released and converted from latent BTU's in the primary fuel to enthalpy of work.

During the combustion/power cycle and the piston 14 reaching bottom dead center of its combustion/power cycle, the exhaust valve(s) 32 of cylinder 10 open and the exhaust gases exit the cylinder 10 as the piston 14 moves or travels upward during this exhaust cycle while the exhaust valve 32 is open. The exhaust gases exit through an exhaust system 30 (e.g. through a manifold, muffler, pollution controls, exhaust pipe, etc., that are not shown for brevity and clarity reasons).

Figure 2:
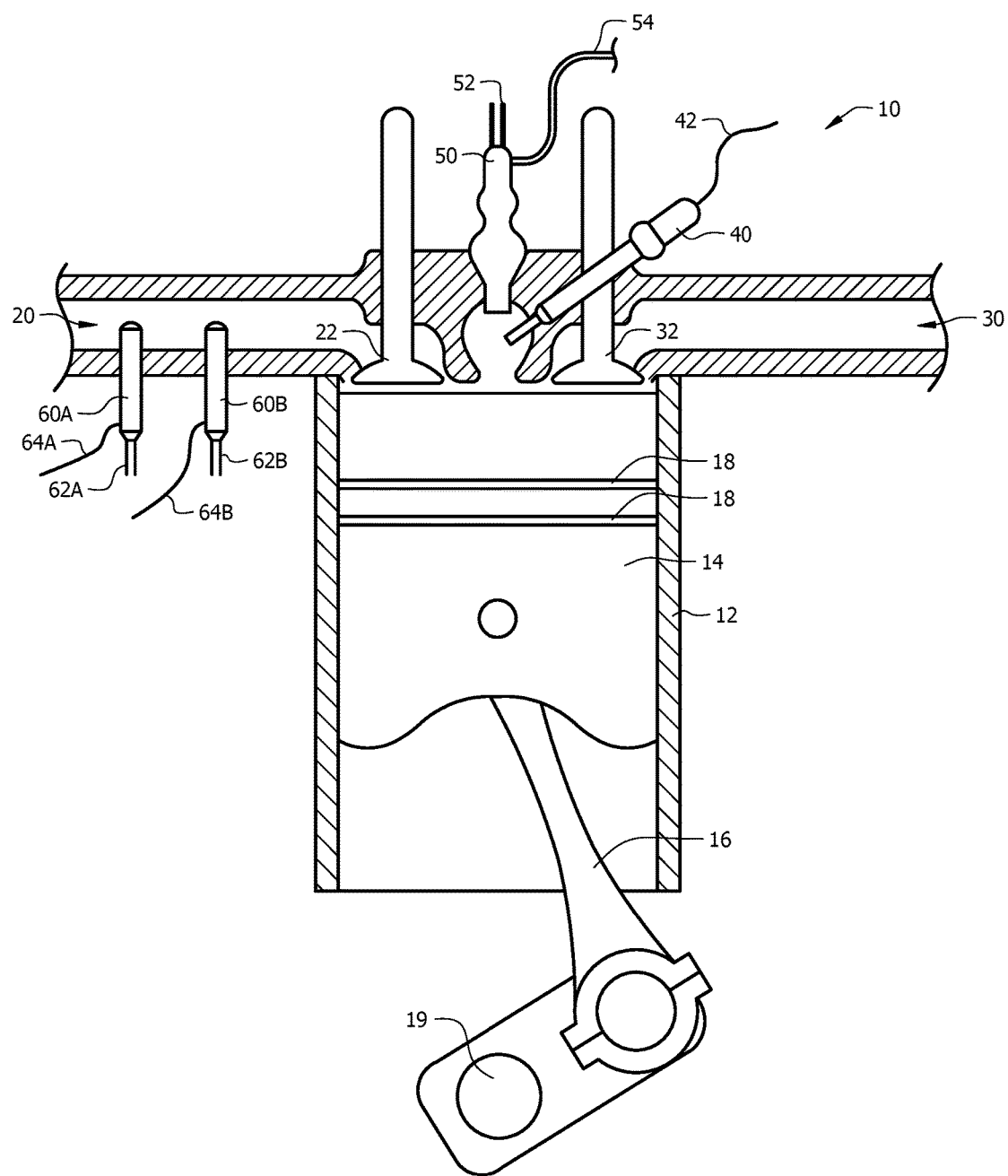
FIG. 2 illustrates a cut-away view of a single cylinder of a diesel engine as modified by the present invention.

Referring to FIG. 2, a cut-away view of a cylinder 10 of a diesel engine as modified by the present invention is shown. Note that many components of the cylinder 10 are the same as in FIG. 1, with the exception of one or more secondary fuel injectors 60A/60B. As above, this exemplary cylinder 10 has a cylinder wall 12, a piston 14 within the cylinder wall 12 having rings 18 that provide a seal from gas escaping past the piston 14 and cylinder wall 10 during compression and as the combustion gases expand due to heat of enthalpy. The piston 14 is coupled to the crankshaft 19 by a connecting rod 16.

Primary fuel (e.g. diesel fuel) from the primary fuel distribution system 52 is injected into the cylinder 10 by a primary fuel injector 50 under control of electrical pulses (as previously discussed) from a primary fuel injection wire 54.

Air required for combustion flows into the cylinder 10 through the intake valve port 20 during an intake cycle as the piston 14 moves downward (with respect to FIG. 2) and the intake valve 22 is open. The intake valve 22 is opened mechanically by a cam shaft, valve rods, and lifters that are not shown for brevity and clarity reasons. The intake valve port 20 is modified to include one or more secondary fuel injectors 60A/60B for injecting secondary fuel (e.g. compressed natural gas, etc.) into the incoming air during the intake cycle as the piston 14 moves downward (with respect to FIG. 2) and the intake valve 22 is open. During this time secondary fuel is injected into the cylinder 10 along with the incoming air. The secondary fuel injectors are connected to the secondary fuel distribution lines 62A/62B and the amount of secondary fuel injected is controlled by the pulse width signal sent to the secondary injector(s) 60A/60B. This electrical pulse is received by secondary fuel injector via the control lines 64A/64B. As will be shown, the timing of the initial secondary fuel injection and the duration of the electrical pulses sent to the secondary fuel injector(s) 60A/60B is controlled to provide specific amounts of the secondary fuel based upon engine revolutions per minute (RPM) (the secondary fuel injection window) and the energy value in BTU's of the primary fuel injected during the previous compression/ignition cycle.

As in FIG. 1, after the combustion/ignition and power cycles, exhaust gases exit the cylinder 10 as the piston 14 moves upward while the exhaust valve 32 is open, The exhaust gases exit through an exhaust system 30 (e.g. through a manifold, muffler, pollution controls, exhaust pipe, etc., that are not shown for brevity and clarity reasons).

Figure 3:
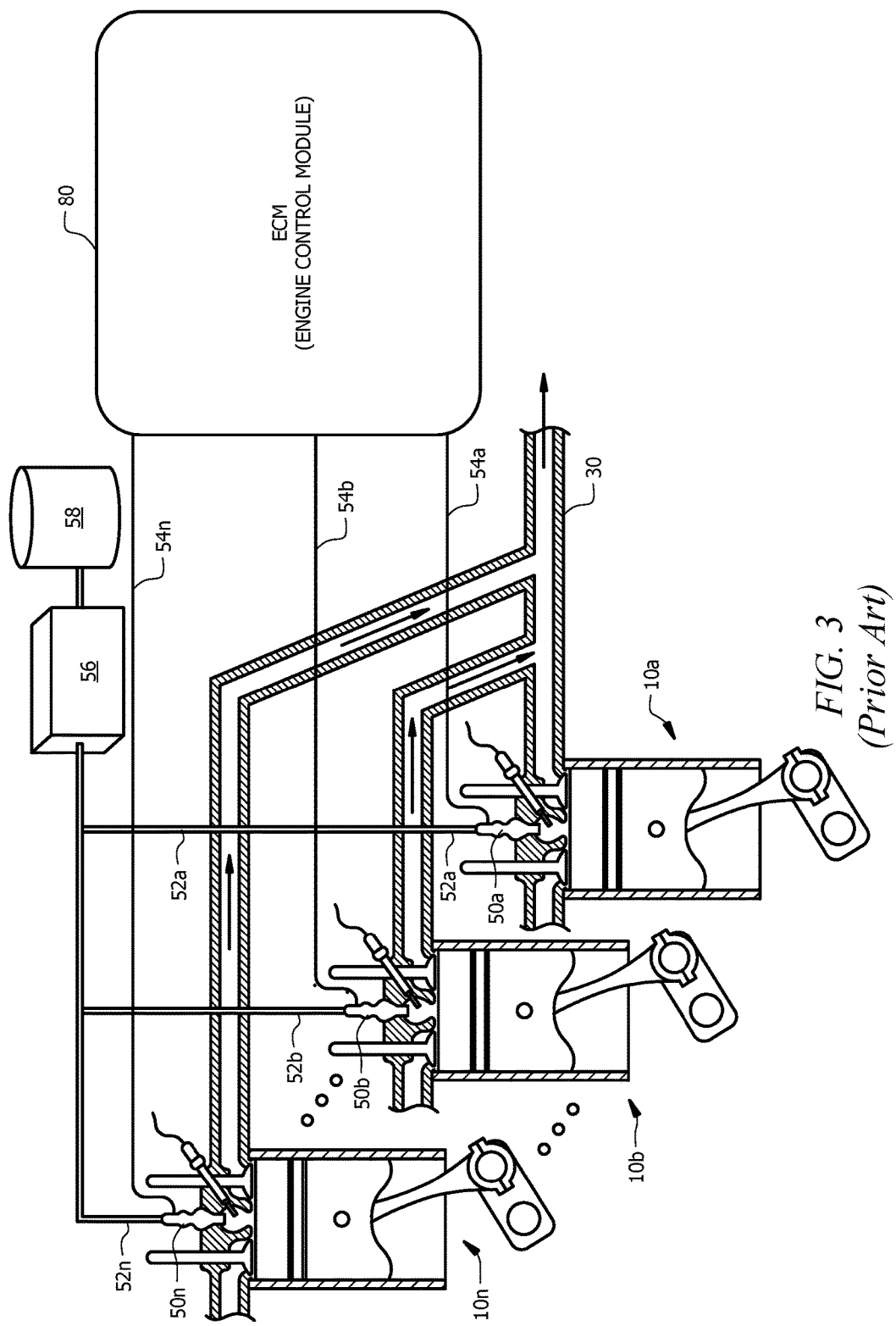
FIG. 3 illustrates a schematic view of an engine and controller of the prior art.

Referring to FIG. 3, a schematic view of an simplified engine and engine control module 80 of the prior art is shown with multiple cylinder 10s, cylinder 10a, cylinder 10b, . . . cylinder 10c. The primary fuel (e.g. diesel) is stored in a fuel tank 58 and pressurized by a fuel pump 56 for delivery to the primary fuel injectors 52a/52b/52n under control of primary fuel electrical pulses from the engine control module 80 delivered over primary fuel injection wires 54a/54b/54n. In general, the primary fuel injector 50 electrical injection pulses are delivered to each cylinder 10a, cylinder 10b, . . . cylinder 10c injector 50 during the compression cycle just before top-dead-center of the piston 14. The duration of the primary fuel electrical injection pulse (s) determines how much primary fuel (e.g. diesel) is directly injected into each cylinder 10a, cylinder 10b, . . . cylinder 10c.

Figure 4:
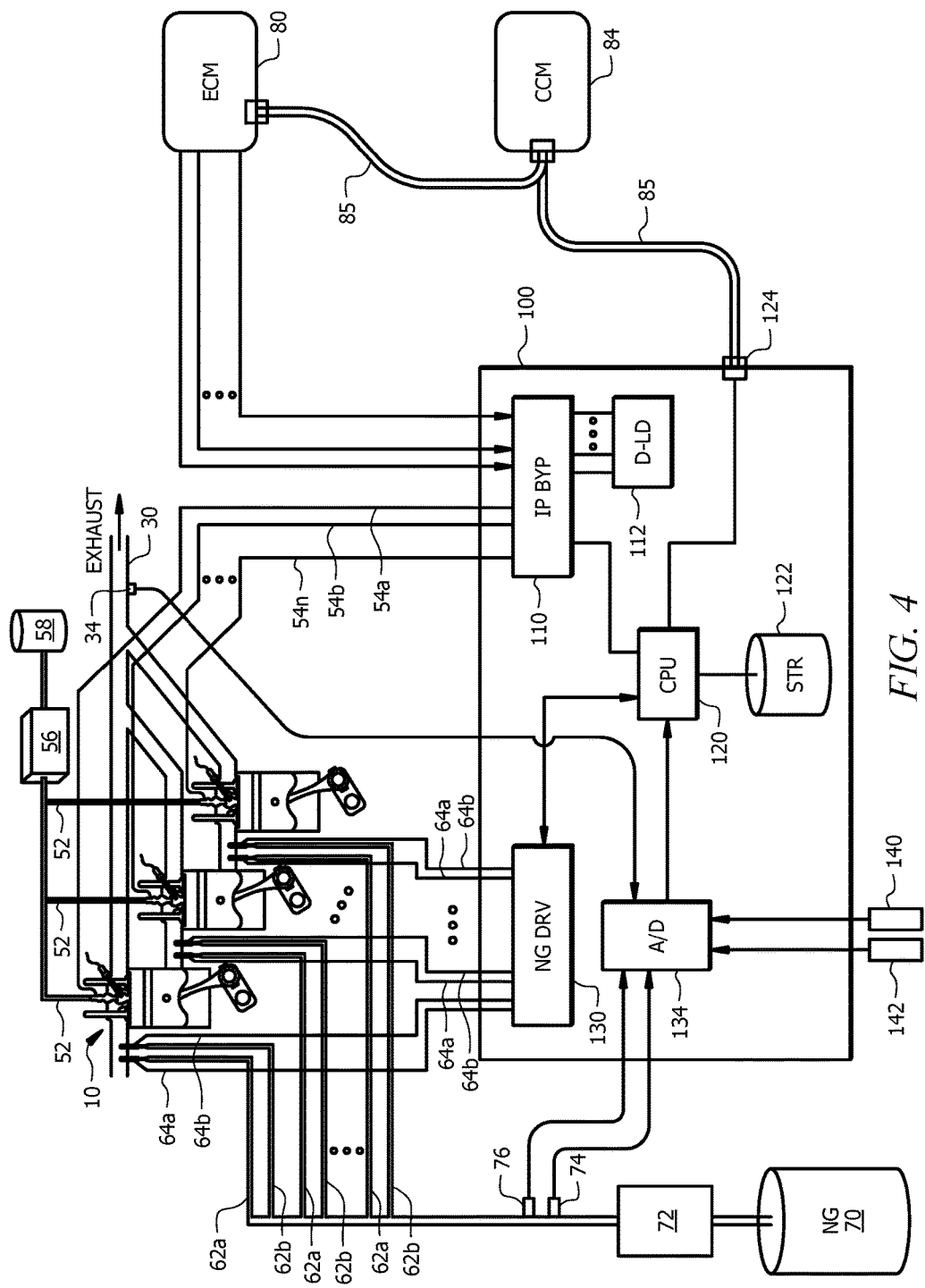
FIG. 4 illustrates a schematic view of an engine and controller as modified by the present invention.

Referring to FIG. 4, a schematic view of an engine and controller as modified by the present invention is shown with multiple cylinder 10s, cylinder 10a, cylinder 10b, . . . cylinder 10c. As in FIG. 3, the primary fuel (e.g. diesel) is stored in a fuel tank 58 and pressurized by a fuel pump 56 for delivery to the primary fuel injectors 52a/52b/52n under control of primary fuel electrical pulses from the engine control module 80 delivered over primary fuel injection wires 54a/54b/54n. In general, the primary fuel electrical pulses are delivered to each cylinder 10a, cylinder 10b, . . . cylinder 10c during the compression cycle just before top-dead-center of the piston 14. The duration of the primary fuel electrical pulses determines how much primary fuel (e.g. diesel) is directly injected into each cylinder 10a, cylinder 10b, . . . cylinder 10c.

The secondary fuel (e.g. compressed natural gas) is stored in a container 70 that is appropriate for the pressure and temperature of the alternative fuel. A flow of the secondary fuel from the container 70 is regulated by a pressure regulator 72 and distributed to each of the secondary fuel injector(s) 64a/64b through secondary fuel distribution lines 62a/62b.

The pressure and temperature of the secondary fuel is monitored using a secondary fuel pressure sensor 74 and a secondary fuel temperature sensor 76.

Each secondary fuel injector control lines 64a/64b is connected to a secondary fuel driver 130 within a precision blending system. As will be described, the precision blending system provides secondary fuel pulses to the secondary fuel injector control lines 64a/64b from the secondary fuel driver 130 at precise timing moments during the intake cycle of cylinder 10 when the secondary fuel window is open, and continues the generation of the signal pulse through the secondary injector control lines 64a/64b for such duration as has been calculated to precisely inject the energy value BTU's that will be removed from the upcoming primary fuel injection event. In the same manner, secondary fuel will be injected into the intake valve port 20 of the respective cylinder 10a, cylinder 10b, . . . cylinder 10c.

During the primary fuel injection event of each cylinder 10a, 10b . . . 10c the primary fuel injection pulses from the primary fuel injection wire 54 from the engine control module 80 are intercepted by the primary fuel injection bypass module 110 of the precision blending controller 100 and are measured for duration, are shortened per the result of substitution ratio calculations or are simply routed to the primary fuel injection bypass module 110 of the precision blending system. In this way, the initial primary fuel injection and fuel energy to be injected by the primary fuel injector 50 remains in the control of the engine control module 80 but the duration of primary fuel injection and thus the volume of thermal energy injected by the primary fuel injector 50 is now controlled by the primary fuel injection bypass module 110 under control of algorithms (to be described later in this application) that run on a processor 120 from storage 122. In many embodiments, the engine control module 80 expects a specific impedance of each primary fuel injector 50 and, hence, a dummy load 112 is provided for each primary fuel injector output of the engine control module 80. The processor 120 of the precision blending controller 100, switches the impedance (load) sensed by the engine control module 80 during primary injector activation to the dummy load 112 so that no on-board diagnostic (OBD) primary fuel injector fault is sensed. Otherwise, the engine control module 80 will interpret the difference in impedance as a faulty primary fuel injector 50. However, the primary fuel injector must be activated for a minimal time (for example a minimal time equivalent to 15% of the total BTU's required by the engine) which provides sufficient time for the engine control module 80 to detect a fault of a primary fuel injector.

Signals from the secondary fuel pressure sensor 74 and the secondary fuel temperature sensor 76 are converted to digital by an analog-to-digital converter 134 of the precision blending controller 100. Further, an methane sensor 34 (e.g. methane sensor, oxygen sensor, etc.), timing sensor 140 (e.g., engine cam sensor), and an engine speed sensor 142 (e.g. engine RPM) are also converted to digital by the analog-to-digital converter 134 of the precision blending controller 100. The analog-to-digital converter 134 conveys digital representation of the signals from the sensors 74/76/34/140/142 to the processor 120.

In some embodiments, the engine control module 80 communicates with a chassis control module 84 by way of a car-area network 85. In some embodiments, the processor 120 of the precision blending controller 100 communicates with the chassis control module 84 and/or the engine control module 80 through a network interface 124 connected to the car-area network 85.

In operation, the precision blending controller 100 collects engine and chassis signal data and calculates a proper blend of primary fuel and secondary fuel required for the current performance load demand. The precision blending controller 100 determines the necessary energy value (blended fuel volume) demand per each engine cylinder. The original signals from the engine control module 80 are not modified, except for the pulse duration of the primary fuel injection signals 54a/54b/54n. As the calculation determines that the amount of primary fuels is to be reduced and supplemented by an amount of secondary fuel, the primary fuel injection signals 54a/54b/54n that are diverted to the primary fuel injection bypass module 110 are altered, having a shorter duration, then delivered to the primary fuel injectors 50. This mechanism provides an electronically controlled fuel injected engine having one or multiple cylinders with controls to operate on a blend of primary fuel and secondary fuel. The OEM fuel system remains the active or primary fuel system while the precision blending controller 100 determines the percentage of the total energy value to be substituted by volume of secondary fuel injected into each cylinder during a fuel injection event.

The secondary fuel is required to be injected before the primary fuel injection period. Therefore, the primary fuel injection pulse width from the previous cycle is used to determine the amount of secondary fuel to be injected in the current cycle as well as the reduction in the primary fuel pulse width such that less fuel is injected in the current cycle for the cylinder. Actually, the substitution of the primary fuel with the secondary fuel is one full cycle per cylinder behind the demand of the driver, the time required at 1100 RPM is approximately 0.11 seconds behind where the engine would be if it ran 100% on the primary fuel. This time delay is of no significance in that the time delay cannot be sensed by humans operating the engine and the time lag only occurs at the beginning of the fuel blending process. Therefore, the driver feels no difference in response of the engine.

Briefly, the operational sequence for each blended fuel cycle of each cylinder:
1. Crankshaft speed (RPM) is monitored and used to determine the secondary fuel injection window duration (e.g. in microseconds).
2. The maximum BTU content of the secondary fuel that can be injected during the "open" secondary fuel injection window (at gaseous pressure) is determined.
3. The maximum BTU content of the secondary fuel to the total of BTUs of the primary fuel injection requested by the engine control module 80 (% ratio) is determined.
4. The secondary fuel BTU volume is injected during the next intake cycle.
5. The primary fuel injection pulse is shortened to allow only a percentage of the BTUs of primary fuel (see #3 above) to be injected during the injection event. (Total primary fuel BTUs—Secondary fuel BTUs=total BTUs=injected by both primary fuel and secondary fuel injection.) In other words, a reduced portion of BTUs from the primary fuel added to the BTUs provided by the secondary fuel is the total BTU energy injected and is equivalent to the number of BTUs that the engine control module 80 has requested based upon the primary fuel injector 50 and the primary fuel injection pulse width.

These steps are repeated for every cylinder of a multi-cylinder diesel engine.

The precision blending controller 100 calculate each cylinder's 10 fuel energy value for the next power cycle, appropriately reduces injection volume of the primary fuel (e.g., reducing the primary fuel injector signal's pulse width) and controls injection of the secondary fuel thereby operating the engine on a sequentially injected blend of primary fuel and secondary fuel. The calculations prevent over fueling or under fueling problems inherent with single port and multi-port gaseous injection systems that cannot control the fuel BTU value for each cylinder thus causing an imbalance of the OEM's engine heat balance formula.

If a fault is detected in the primary or secondary fuel injection system or should the secondary fuel be depleted, the precision blending controller 100 stops injection of the secondary fuel and passes the primary fuel injection pulse signals from the engine control module 80 to the primary fuel injector 50 intact, thereby restoring operation to a standard, OEM mode.

The algorithm used by the precision blending controller 100 analyzes engine efficiency to trim usage of the primary fuel and uses the methane sensor 34 in the exhaust system 30 to determine if over fueling has occurred.

The processor 120 of the precision blending controller 100 calculates the energy input to the engine by multiplying the primary fuel injection pulse width (in microseconds) by the BTU value of the primary fuel per microsecond.

Figure 5:
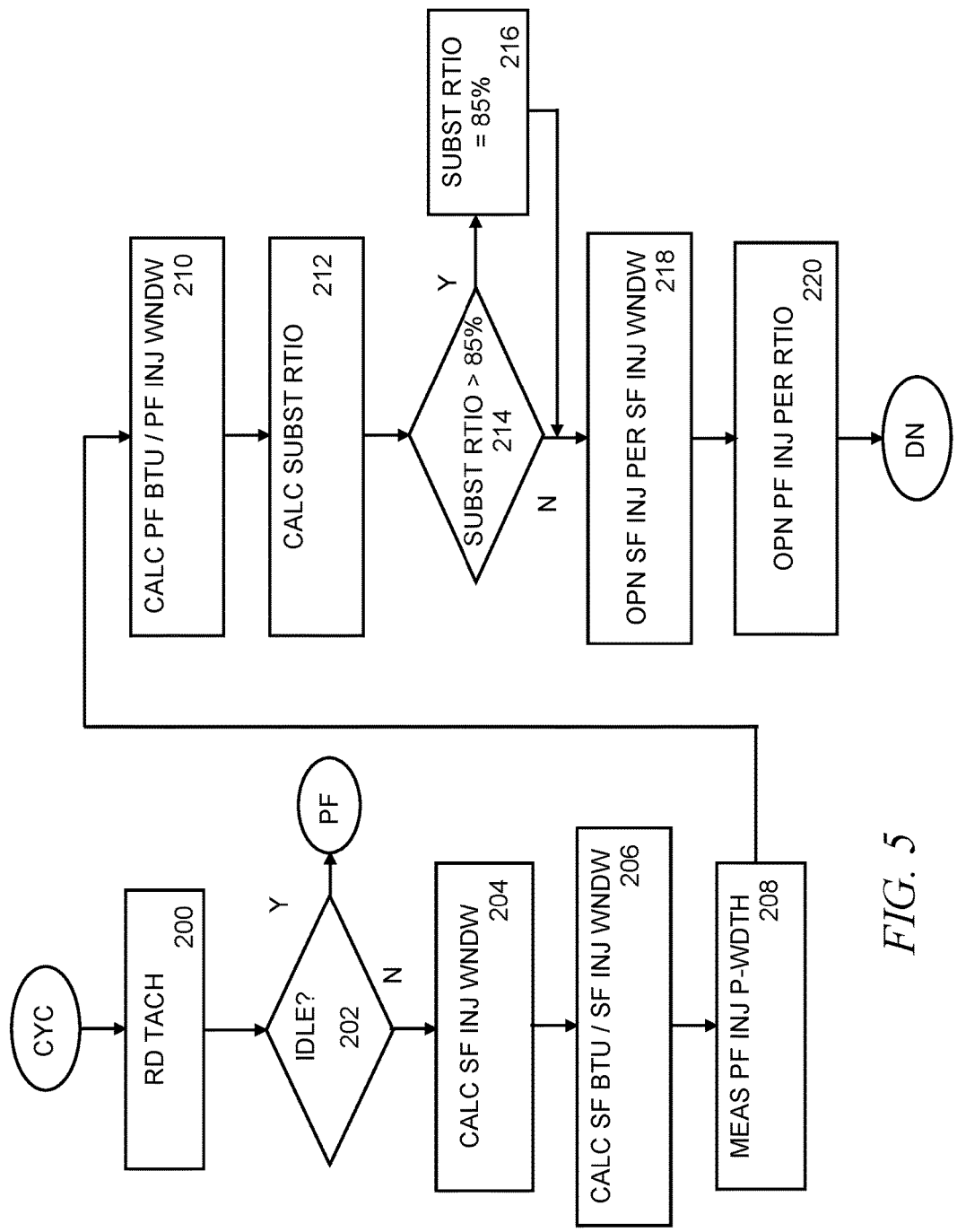
FIGS. 5 and 5A illustrate a high level flow chart of the controller operation.
Figure 5A:
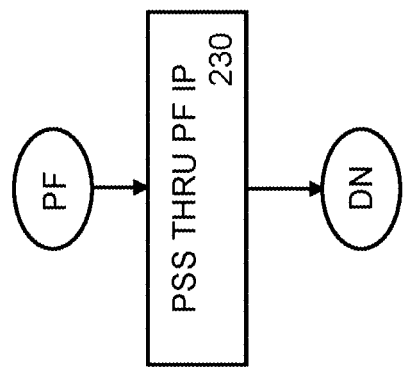

Referring to FIGS. 5 and 5A, a high level flow chart shows the operation of the processor 120 within the precision blending controller 100. The first step is to read 200 the engine RPM (revolutions per minute), for example, directly from the engine speed sensor 142 or from the engine control module 80 through the car-area network 85. If the engine is at idle 202 (e.g. below a specific RPM), then the injection pulse from the engine control module 80 passes through 230 the precision blending controller 100 to the primary fuel injector 50. In this way, during idle operation, the engine operates entirely from the primary fuel (e.g. diesel fuel).

Injection of the secondary fuel, for example, compressed natural gas, is performed during a time window between when the exhaust valve(s) close and approximately 170 to 180 degrees of crankshaft 19 rotation to bottom dead center of the piston 14 during the intake stroke. The secondary fuel injection window is limited to approximately 160 degrees to as high as 175 degrees of rotation to insure there is no methane that slips past the exhaust valve(s) 32 and that there is no loss of vacuum in the cylinder 10 as piston 14 reverses travel from a downward travel to an upward travel in cylinder 10. In the examples, this window is set arbitrarily at 150 degrees for brevity and simplification reasons.

If the engine is not at idle 202 (e.g. above or equal to a specific predetermined RPM), then calculations 204/206/208/210/212 to determine how much secondary fuel (e.g. compressed natural gas) is needed (e.g. supplemental amount of energy) based upon the primary fuel usage of the previous primary fuel injection cycle of the engine and how much secondary fuel can be injected based upon the injection volume of the secondary fuel injectors 60A/60B and the duration of time that the secondary fuel window will be open.

The pulse width of the primary fuel injector 50 from the previous primary fuel injection cycle is used to determine how much primary fuel (e.g. diesel) was to be injected in the previous primary fuel injection cycle. The pulse width of the primary fuel injector 50 from the previous cycle is measured 208 (e.g. in microseconds) and that pulse width is used to determine how much primary fuel heat energy (BTUs) is being requested by the engine control module 80. The primary fuel injection BTU content (e.g., total amount of heat energy required in this cylinder for the current output horsepower) is determined from the engine manufacturer's statement of fuel maximum delivery using an ASTM designated fuel of known BTU content as reported to the EPA and has been entered into public record and accessible on the EPA website. The primary fuel pressure at the injector or rail pressure if such are used in a fluctuating pressure fuel system are monitored and entered into the primary fuel delivery equation. (for the sake of brevity and clarity a fuel system that uses a variable primary fuel injection pressure system is not discussed here). That notwithstanding, in some embodiments, for some fuel systems, the primary fuel pressure is monitored to determine maximum primary fuel injection BTU content. In either, a calculation is made to determine the thermal unit content (e.g. in British Thermal Units—BTU) of this volume of fuel 210.

It is desired to use less primary fuel (e.g. diesel) and more secondary fuel (e.g. liquid natural gas) because the cost per thermal unit of the primary fuel is much greater than the cost per thermal unit of the secondary fuel. Therefore, the disclosed system looks to reduce the amount of primary fuel injected by reducing the pulse width provided to the primary fuel injector 50 and supplement the heat that would have been provided by the primary fuel with an equivalent amount of heat from the secondary fuel by injecting the secondary fuel into the intake valve port of the cylinder 10.

Therefore, an injection window for the secondary window is calculated 204 (e.g. the number of microseconds that the secondary fuel injectors 60A/60B will be open) based upon the number of secondary fuel injectors 60A/60B and the pressure of the secondary fuel (e.g. as read from the secondary fuel pressure sensor 74). Now the total number of thermal units (e.g. BTU) that can be injected by the secondary fuel injectors 60A/60B during the injection window (e.g. 150 degrees) is calculated 206 based upon the specifications of the secondary fuel (e.g. BTUs per liter) and the volume of secondary fuel that is possible to be injected given the pressure of the secondary fuel, specifications of the secondary fuel injectors 60A/60B, and the number of the secondary fuel injectors 60A/60B.

A substitution ratio is calculated 212 that indicates the amount of primary fuel that can be replaced by an equal number of BTUs of secondary fuel. For example, a substitution ratio of 50% means that it is possible for only 50% of the needed BTUs to be replaced by the secondary fuel due to a maximum time window, secondary fuel pressure and secondary fuel injectors 60A/60B.

A maximum [safe] substitution ratio has been established, in this example, 85%, though this value is an arbitrary and settable threshold that can be adjusted higher or lower to accommodate various engine styles, applications and designs. In this, even if the secondary fuel injection system is capable of injecting sufficient secondary fuel to replace more than 85% of the primary fuel, the injection is capped at 85%. So, if the substitution ratio is greater than 85% 214, then the substitution ratio is set to 85% 216.

Now, the precision blending controller 100, at the proper time, opens 218 the secondary fuel injectors 60A/60B for the appropriate amount of time to inject the secondary fuel as signaled by the processor 120 of the precision blending controller 100, thus delivering the equivalent thermal units of the secondary fuel to the cylinder 10. When the processor 120 of the precision blending controller 100 receives the primary fuel injector pulse from the engine control module 80, the controller reduces the pulse width of primary fuel injector pulse by the substitution ratio and sends the reduced primary fuel injection pulse to the primary fuel injector 50. For example, if the substitution ratio is 60%, then the primary fuel injector pulse is set to the pulse width associated with a reduction of 40% of the BTUs associated with that primary fuel injection pulse from the engine control module 80 and the secondary fuel injectors 60A/60B are controlled to deliver a volume of secondary fuel that possesses an equivalent amount of thermal energy (BTUs) as would have been delivered by the amount of primary fuel that was not injected (e.g. 60% of the primary fuel heat energy (BTUs) that would have been injected).

In such, it is possible to replace the primary fuel energy heat value of up to the maximum substitution ratio (e.g. 85%) of the primary fuel with an equivalent amount of secondary fuel (based upon thermal units of the primary fuel and secondary fuel). This yields substantial savings based upon the costs of the primary fuel in contrast with the costs of the secondary fuel.

Figure 6:
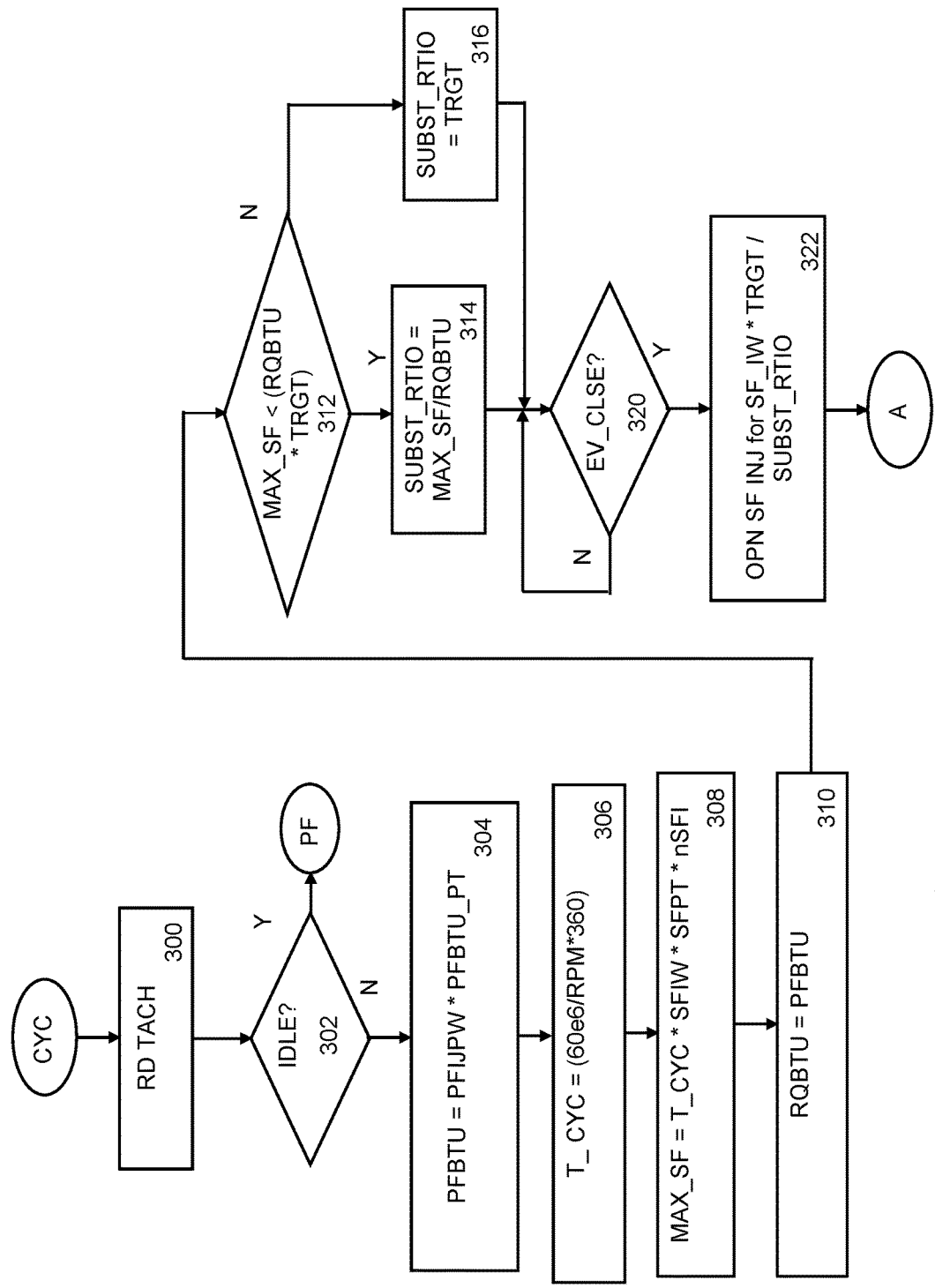
FIGS. 6 and 6A illustrates a detail flow chart of the controller operation.
Figure 6A:
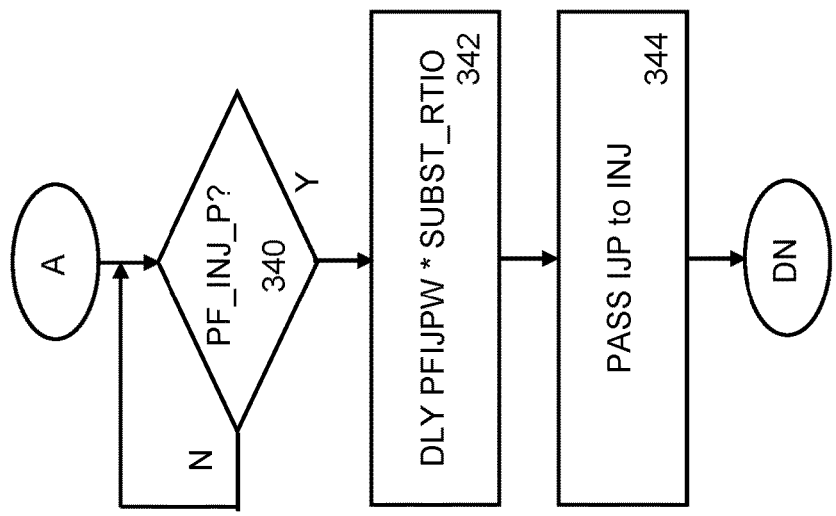

Referring to FIGS. 6 and 6A, a detailed flow chart shows the operation of the processor 120 within the precision blending controller 100. Note that the exact math and order of steps is an example as it is well known to calculate certain values in different order and steps/equations.

The first step is to read 300 the engine RPM (revolutions per minute), for example, directly from the engine speed sensor 142 or from the engine control module 80 through the car-area network 85. The engine speed is used to determine the maximum amount of secondary fuel that can be injected.

If the engine is at idle 302 (e.g. below a specific RPM), then the injection pulse from the engine control module 80 passes through 230 the precision blending controller 100 to the primary fuel injector 50. In this way, during idle operation, the engine operates entirely from the primary fuel (e.g. diesel fuel).

Injection of the secondary fuel, for example, compressed natural gas, is performed during a time window between when the exhaust valve(s) close and approximately 170 degrees to bottom dead center during the intake stroke. Many engines having a primary fuel of diesel fuel close the exhaust valve between 5 to 10 degrees past top dead center. Therefore, the secondary fuel injection window is limited to 160 degrees as high as 175 degrees of rotation. In the examples, this window is set at 150 degrees to prevent secondary fuel slip past the exhaust valve and to prevent stagnation of air that occurs toward the end of the intake cycle.

If the engine is not at idle 302 (e.g. above or equal to a specific RPM), then the BTU content of the primary fuel (PFBTU) from the previous cycle is determined 304 by multiplying the pulse width of the prior injection pulse (PFIJPW) by the primary fuel BTUs that are injected per time period (PFBTU_PT). For example, calculating in microseconds, if the primary fuel injectors inject 1.2 BTUs of primary fuel per microsecond (PFBTU_PT=1.2) and the primary fuel injection pulse width is 4.5 microseconds (PFIJPW=4.5), then in the prior cycle, 5.4 BTUs of primary fuel was injected (PFBTU=5.4 BTUs).

Next, a calculation is made to determine the maximum amount of time possible for secondary fuel injection based upon the current rotational speed of the engine (RPM) measured in revolutions per minute. First, the time for a single cycle of the engine is calculated 306. The time for a single cycle is calculated 306 by dividing a constant (60*106) by the engine rotational speed (RPM) times 360. This results in the time of an entire cycle of the engine at the current rotational speed (RPM).

Next, the maximum amount of secondary fuel that can be injected (MAX_SF) given the single cycle time is calculated 308. The maximum amount of secondary fuel that can be injected (MAX_SF) is calculated 308 by multiplying the time for a single cycle (T_CYC) by the percentage of the cycle that is available for injection of the secondary fuel, or the secondary fuel injection window (SFIW), multiplied by the flow rate of a single secondary fuel injector (SFPT) in BTUs per time interval and multiplied by the number of secondary fuel injectors (NSFI).

Now the required BTU (RQ_BTU) for the next engine cycle is calculated 310 by multiplying the pulse width of the previous primary fuel injection pulse (PFIJPW) by the primary fuel BTU content per period of time (PFBTU_PT) as can be injected given the injection system of the engine. This is the same value as the primary fuel BTU (PFBTU). For example, if the BTU injection rate expressed in BTU per microsecond is 1.1 BTU/microsecond, and the previous primary fuel injection pulse width was 8 microseconds, then the BTU content of the primary fuel that was requested to be injected in the last cycle by the engine control module 80 was 8.8 BTUs. This is the amount of heat required to run the engine at the current RPM and required horsepower.

So far, the maximum secondary fuel injection (in BTUs) and the prior primary fuel injection (in BTUs) have been calculated. A target substitution ratio (TRGT) is set as a constant for the engine, for example, 85%. This means that, even if the secondary fuel injectors 60A/60B are capable of injecting more than 85% of the total required BTUs, the secondary fuel injection is limited to 85% and, therefore, there is never a situation in which less than 15% of the required BTU for this cylinder is delivered from the primary fuel.

If the maximum secondary fuel injection (MAX_SF) is less than the total required BTU times the target substitution rate (TRGT) 312, then the target substitution rate cannot be satisfied by the secondary fuel injectors 60A/60B and the substitution ratio (SUBST_RTIO) is set 314 to the maximum secondary fuel injection (MAX_SF) divided by the total required BTU (RQBTU). In other words, the secondary fuel injectors 60A/60B cannot provide sufficient BTUs of secondary fuel, so the substitution ratio is set to provide the maximum secondary fuel that can be injected.

If the maximum secondary fuel injection (MAX_SF) is not less than (greater than or equal) the total required BTU times the target substitution rate (TRGT) 312, then the target substitution rate can be achieved and the substitution ratio (SUBST_RTIO) is set to the target substitution ratio (TRGT), for example, 85% as has been determined.

Injection of the secondary fuel is performed during a time window between when the exhaust valve(s) close and approximately 170 to 180 degrees to bottom dead center during the intake stroke. Now, the precision blending controller 100 waits for the exhaust valve closure 320 of the current cylinder. After the exhaust valve closure 320 of the current cylinder, the precision blending controller 100 opens 322 the secondary fuel injectors 60A/60B for an amount of time equivalent to the secondary fuel injection window times the target substitution ratio (TRGT) divided by the substitution ratio SUBST_RTIO. For example, if the target substitution ratio (TRGT) is 85% and the substitution ratio SUBST_RTIO is 85%, then the secondary fuel injectors 60A/60B are opened for the entire injection window, delivering the equivalent thermal units of the secondary fuel to the cylinder 10. Similarly, if the target substitution ratio (TRGT) is 85% and the substitution ratio SUBST_RTIO is 50%, then the secondary fuel injectors 60A/60B are opened for 50/85 (e.g. 59%) of entire injection window.

When the precision blending controller 100 receives 340 the primary fuel injector pulse (PF_INJ_P) from the engine control module 80, the precision blending controller 100 reduces the pulse width of primary fuel injector pulse by the substitution ratio (SUBST_RTIO) This reduction of the primary fuel injection pulse width is accomplished by intercepting the primary fuel injection pulse and sinking primary fuel injection pulse into a dummy load 112 (e.g. coil). The primary fuel pulse is thus shortened to a length equal to the pulse length associated to the heat energy (BTU's) that will be required during the next primary fuel injection event. The amount of time alteration is determined from the primary fuel injection pulse width of the previous primary fuel injection cycle (PFIJPW) multiplied by the substitution ratio (SUBST_RTIO). The processor of the precision blending controller 100 calculates the length of the primary injection pulse required for the primary fuel injector 50 to inject the balance of the heat energy required for this primary fuel injection cycle. At the correct time for primary fuel injection, the engine control module 80 sends the pulse to primary fuel injector 50 through the primary fuel injection bypass module 110. At the proper pre-calculated length of primary fuel injection pulse length, the primary fuel injection bypass module 110 of the precision blending controller 100 sends the primary fuel injection pulse to the dummy load 112. Switching the primary injection pulse to the dummy load 112, turns off the primary fuel injector in our example and the cycle is complete. The example given is for an primary fuel injector 50 that is electronically controlled by one energized coil. In the case that the injector of the fuel system is energized by a first electrical coil and is de-energized by a second electrical coil, a pulse must be generated by the precision blending controller 100 to close the coil but will switch the closing impedance back to the engine control module 80 to avoid the engine control module 80 sensing a false coil fault with the respective injector. (Details of this type system are not discussed for brevity and clarity) This function in turn is repeated for each cylinder 10 of a multi-cylinder engine.

When the primary fuel injector pulse (PF_INJ_P), the primary fuel injector 50 closes, completing the cycle. For example, if the substitution ratio is 60% and the primary fuel injection pulse width is 10 microseconds, then the delay is 60% times 10 microseconds, or 6 microseconds, resulting in a 4 microsecond primary fuel injector pulse width, delivering 40% of the required BTUs from the primary fuel. In this example, the BTU content of the secondary fuel injected in that cycle would be equivalent to the BTU content of 60% of the primary fuel that would have been injected (e.g., the requested amount of primary fuel by the engine control module).

FIG. 7 shows a generic formula for diesel injection supplemented by compressed natural gas.

FIG. 8 shows a sample calculation of parameters for a diesel fuel engine with supplemental compressed natural gas injection.

FIG. 9 shows a sample diesel replacement rate for a diesel fuel (primary fuel) engine with supplemental compressed natural gas (secondary fuel) injection. For example, in the first line, the diesel injection pulse width from the engine control module 80 is 500us. This equates to 2.747 BTUs per primary fuel injection event for the example engine. To obtain the total 2.747 BTUs needed for the next cycle, 2.335 BTUs of natural gas are injected through the injectors 60A/60B and the diesel injection pulse width is reduced from 500us down to 75us, thereby delivering 0.412 BTU worth of diesel fuel (primary fuel).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of calculating a supplemental fuel replacement quantity comprising:
    means for calculating an amount of time available for injection of the supplemental fuel based upon a rotational speed of a crankshaft of an engine;
    means for calculating a total amount of heat energy required by the engine for a next cycle;
    means for calculating a supplemental amount of heat energy that is to be provided by the supplemental fuel;
    means for reducing an amount of a primary fuel to be provided to a cylinder of the engine during the next cycle;
    means for providing an amount of the supplemental fuel to the cylinder of the engine during the next cycle, the amount of the supplemental fuel is sufficient to provide the supplemental amount of heat energy.

2. The method of calculating the supplemental fuel replacement quantity of claim 1, wherein the primary fuel is diesel.

3. The method of calculating the supplemental fuel replacement quantity of claim 1, wherein the supplemental fuel is natural gas.

4. The method of calculating the supplemental fuel replacement quantity of claim 1, wherein the supplemental fuel is compressed natural gas.

5. The method of calculating the supplemental fuel replacement quantity of claim 1, wherein the supplemental fuel is liquefied natural gas.

6. The method of calculating the supplemental fuel replacement quantity of claim 1, wherein the means for reducing an amount of the primary fuel that is provided to the cylinder comprises reducing a width of a primary fuel injection pulse from an engine control module that is provided to a primary fuel injector interfaced to the cylinder.

7. The method of calculating the supplemental fuel replacement quantity of claim 6, whereas the width of the primary fuel injection pulse is reduced by a time period that is proportional to the supplemental amount of the heat energy that is to be provided to the cylinder by the supplemental fuel.

8. A method of supplementing a primary fuel with a secondary fuel in an engine, the method comprising:
    calculating a maximum amount of secondary fuel that can be injected into a cylinder of the engine during a cycle of the engine;
    calculating a maximum amount of heat energy provided by the maximum amount of the secondary fuel that can be injected into the cylinder of the engine during the cycle of the engine;
    calculating a total amount of heat energy needed by the cylinder given the primary fuel and a primary fuel injection pulse width;
    determining a replacement ratio by comparing the maximum amount of heat energy provided by the maximum amount of secondary fuel with the total amount of heat energy needed;
    injecting an amount of the secondary fuel into the intake valve port of the cylinder determined by the replacement ratio; and reducing a width of the primary fuel injection pulse provided to a primary fuel injector of the cylinder based upon the replacement ratio.

9. The method of claim 8, wherein the primary fuel is diesel.

10. The method of claim 8, wherein the secondary fuel is natural gas.

11. The method of claim 8, wherein the secondary fuel is compressed natural gas.

12. The method of claim 8, further comprising before the step of injection, the step of:
if the replacement ratio is greater than a predetermined maximum replacement ratio, setting the replacement ratio to the predetermined maximum replacement ratio.

13. The method of claim 8, wherein the calculating of the maximum amount of heat energy provided by the maximum amount of the secondary fuel that can be injected into the cylinder of the engine during the cycle of the engine is performed using the secondary fuel thermal energy content per unit volume, a number of secondary fuel injectors interfaced to the intake valve port of the cylinder, a flow rate of each of the secondary fuel injectors, and a time window that is proportional to a rotational speed of a crankshaft of the engine.

14. A secondary fuel injection system comprising:
a source of secondary fuel;
a secondary fuel injector fluidly coupled to the source of secondary fuel, the secondary fuel injector electrically controlled to inject an amount of the secondary fuel into an intake valve port of a cylinder of an engine;
a processor receiving a signal indicating a rotational speed of a crankshaft of the engine;
software running on the processor configured to calculate an amount of time available for injection of the secondary fuel into the intake valve port of a the cylinder;
the software configured to calculate an amount of heat energy required by the engine for a next cycle by multiplying a width of a primary fuel injection pulse received from an engine control module by an amount of heat energy per time period based upon a specification of the engine;
the software configured to calculate a supplemental amount of heat energy that is to be provided to the engine by injection of the secondary fuel based upon the amount of time available for injection of the secondary fuel;
the software configured to electrically control the secondary fuel injector to open after an respective exhaust valve of the engine closes for a period of time required to provide the supplemental amount of heat energy from the secondary fuel; and
the software configured to provide a shortened injection pulse to a primary fuel injector interfaced to the cylinder responsive to receiving a subsequent primary fuel injection pulse from the engine control module, a width of the shortened injection pulse is proportional to an amount of primary fuel having a heat energy that is equivalent to the amount of heat energy required minus the supplemental amount of heat energy.

15. The secondary fuel injection system of claim 14, wherein the primary fuel is diesel.

16. The secondary fuel injection system of claim 14, wherein the secondary fuel is natural gas.

17. The secondary fuel injection system of claim 14, wherein the secondary fuel is compressed natural gas.

18. The secondary fuel injection system of claim 14, wherein the secondary fuel is liquefied natural gas.

19. The secondary fuel injection system of claim 14, wherein the signal indicating a rotational speed of the crankshaft of the engine is from an engine timing signal.

* * * * *